Patented June 26, 1928.

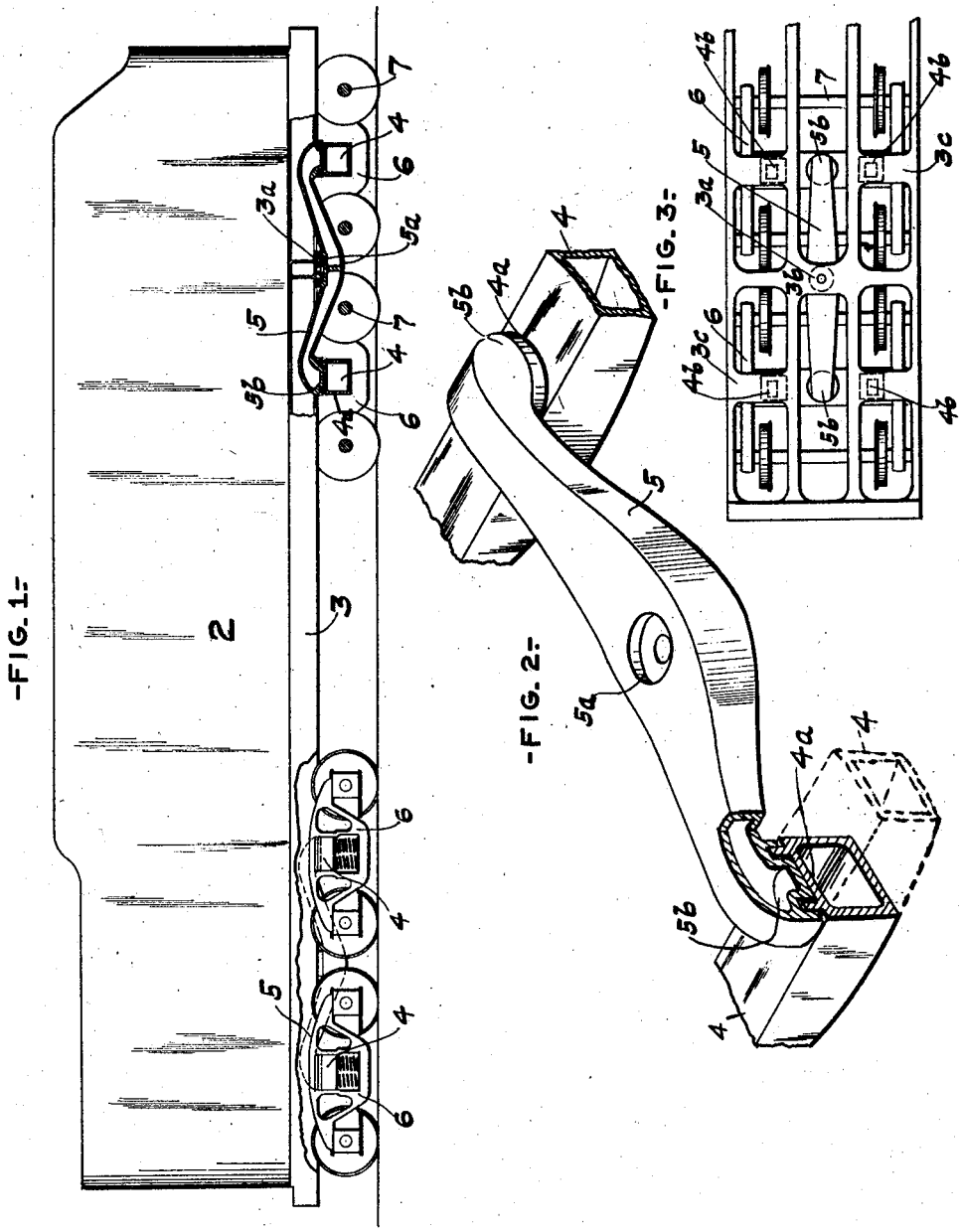

UNITED STATES PATENT OFFICE.

JAMES G. BLUNT, OF SCHENECTADY, NEW YORK.

TRUCK FOR RAILWAY VEHICLES.

Application filed June 1, 1925. Serial No. 33,880.

My invention relates to trucks used for railway vehicles, and has for its object a combination of truck units of existing designs in such a way as to produce a truck of increased capacity capable of carrying the greatly increased weights of modern railway vehicles.

The demand for increased carrying capacity of locomotive tender and car trucks has reached the point where it now seems necessary to provide trucks having four or more axles. Such a number of axles is required in a truck unit support for a tender or car bolster in order to keep the journal bearings within the dimensions in common use and to avoid heating of the journals due to the excessive surface or rubbing speed obtained in journals of larger diameters and also in order to prevent excessive journal length which would increase the overhang from the wheel hub and so decrease the strength of the axle and increase its liability to fracture.

To effect this increase in capacity I provide a center plate or center bearing beam, each end of which is adapted to rest in the center plate of each truck unit used in the combination, having a suitable center plate bearing located between the ends to receive the body center plate of the vehicle body.

By the use of this center bearing beam I provide an effective lateral shock-absorbing device for each of the truck units comprising the combination, without the use of additional mechanism, since the beam acting as a lever about a central fulcrum divides the lateral displacement of one unit between the units which make up the truck.

My invention also makes use of side bearings contacting between the body and truck bolsters when the superstructure sways, one set being provided for each truck unit comprising the truck. These contacting surfaces are of such size and are so disposed as to accommodate the range of movement of the truck units and give the structure the necessary stability.

The invention claimed is hereinafter fully set forth.

In the accompanying drawing: Figure 1 is a side view, partly in elevation, and partly in section, of a locomotive tender, illustrating an embodiment of my invention; Fig. 2, a view, in perspective, of the load carrying member thereof; and, Fig. 3, a partial plan view of the underframe structure.

In the practice of my invention, referring descriptively to the specific embodiment thereof which is herein exemplified, the vehicle body, 2, illustrated as the tank of a locomotive tender, rests on an underframe structure, 3, from which the weight of the vehicle body, and its load, is transmitted, at points adjacent to the ends of the underframe, to two pairs of four wheeled trucks, 6, each of which pairs is fitted to swivel, as a unit, or single articulated truck, about an axial line which is concentric with a body centre plate, $3^a$, secured to a body bolster, $3^b$, which forms part of the underframe structure.

The centre plate, $3^a$, of each pair of trucks, 6, is, in turn, carried upon the centre bearing, $5^a$, of a longitudinally extending load carrying member, which is a beam, 5, having pivotal bearings, $5^b$, on its ends, resting on the centre plates $4^a$, of the truck bolsters, 4, and a centre bearing, $5^a$. The load carrying member is downwardly curved or depressed between its end bearings, in order that its centre bearing, $5^a$, may be located at substantially the same level as its end bearings, $5^b$, as indicated in the pair of trucks shown at the right, in Fig. 1. The load carrying member, 5, forms the connecting link between the two trucks 6 of ordinary design and divides the load imposed at the centre plate $5^a$ between the truck bolsters 4, thus resulting in the distribution of the load to a greater number of axles 7 with the advantages herein described.

The truck bolsters 4 are provided with side bearings $4^b$ as used in current practice and the underframe structure 3 is provided with auxiliary transoms $3^c$, which extend between the side and center sills for the attachment of body side bearings in such a way that the body and truck members of the side bearings will form contact throughout the range of movement of the trucks with respect to the body.

From the construction shown, it will be seen that any lateral displacement of one of the trucks forming the articulated unit will tend to deflect one end of beam 5 laterally, but as this beam has the other truck of the unit attached to its other end and besides is pivotally attached to the body at its center, any lateral movement of one of its ends is resisted by reason of its center and opposite end connections. This is used to advantage to form a lateral shock-absorbing means and is accomplished without the necessity of having to provide additional parts.

While I have shown my invention applied to a combination of two four-wheel (two axle) trucks, it is obviously capable of being applied to various combinations of truck units with which a center bearing beam of the character described may be employed.

What I claim is:

1. In a railroad vehicle, the combination of an under-frame having auxiliary transoms; a plurality of truck units, each having a plurality of axles; a load carrying beam, having an articulated connection with each unit; a centre bearing on the beam, for supporting the under-frame; and side bearings interposed between the under-frame and the units.

2. A truck for railroad vehicles, comprising a pair of wheeled truck units, each having a transverse bolster; a beam extending longitudinally between the wheels of the units, and having its ends articularly connected to the bolsters of the respective units, said beam having an intermediate depressed portion, provided with a bearing to support the load imposed on the truck; and side bearings on the truck.

3. A truck for railroad vehicles, comprising a pair of wheeled truck units, each embodying an axle, and a transverse bolster; a beam disposed in the vertical, longitudinal, central plane of the truck, and having a depressed intermediate portion adapted to support the load imposed on the truck, and a portion at each end of the intermediate portion extending over one of the axles, and articularly connected to one of the bolsters; and side bearings on the truck.

4. In a railroad vehicle, the combination of an under-frame having a weight transmitting transom; and a truck comprising two wheeled units, each including a bolster; a centre beam, having a bearing at each end, pivotally connected to a bearing on one of the bolsters, said beam having a depressed portion intermediate its ends, providing a bearing for supporting the transom, the end and the intermediate bearings of the beam being disposed in substantially the same horizontal plane; and side bearings on the truck.

JAMES G. BLUNT.